United States Patent [19]
Haring

[11] 4,034,873
[45] July 12, 1977

[54] WHEEL SUPPORTING TOWING SLING ATTACHMENT

[76] Inventor: Robert C. Haring, 15 Parkway Court, Orinda, Calif. 94563

[21] Appl. No.: 747,504

[22] Filed: Dec. 6, 1976

[51] Int. Cl.² .......................................... B60P 3/12
[52] U.S. Cl. ............................................ 214/86 A
[58] Field of Search ................. 214/86 A; 280/402; 254/139.1

[56] References Cited
U.S. PATENT DOCUMENTS 3,897,879  8/1975  Bubik ............................... 214/86 A
3,924,763  12/1975  Pigeon ............................ 214/86 A

*Primary Examiner*—Robert G. Sheridan
*Attorney, Agent, or Firm*—Lothrop & West

[57] ABSTRACT

Detachably secured to the towing sling of a tow truck is a substantially horizontal frame including on opposite lateral sides a pair of adjustable wheel cradles arranged to support either the front or the back wheels of a vehicle to be towed. The wheel cradles can be installed under the wheels to be supported while the wheels are on the ground and when the towing sling elevates the frame the superposed wheels and adjacent end of the vehicle are raised for towing.

8 Claims, 7 Drawing Figures

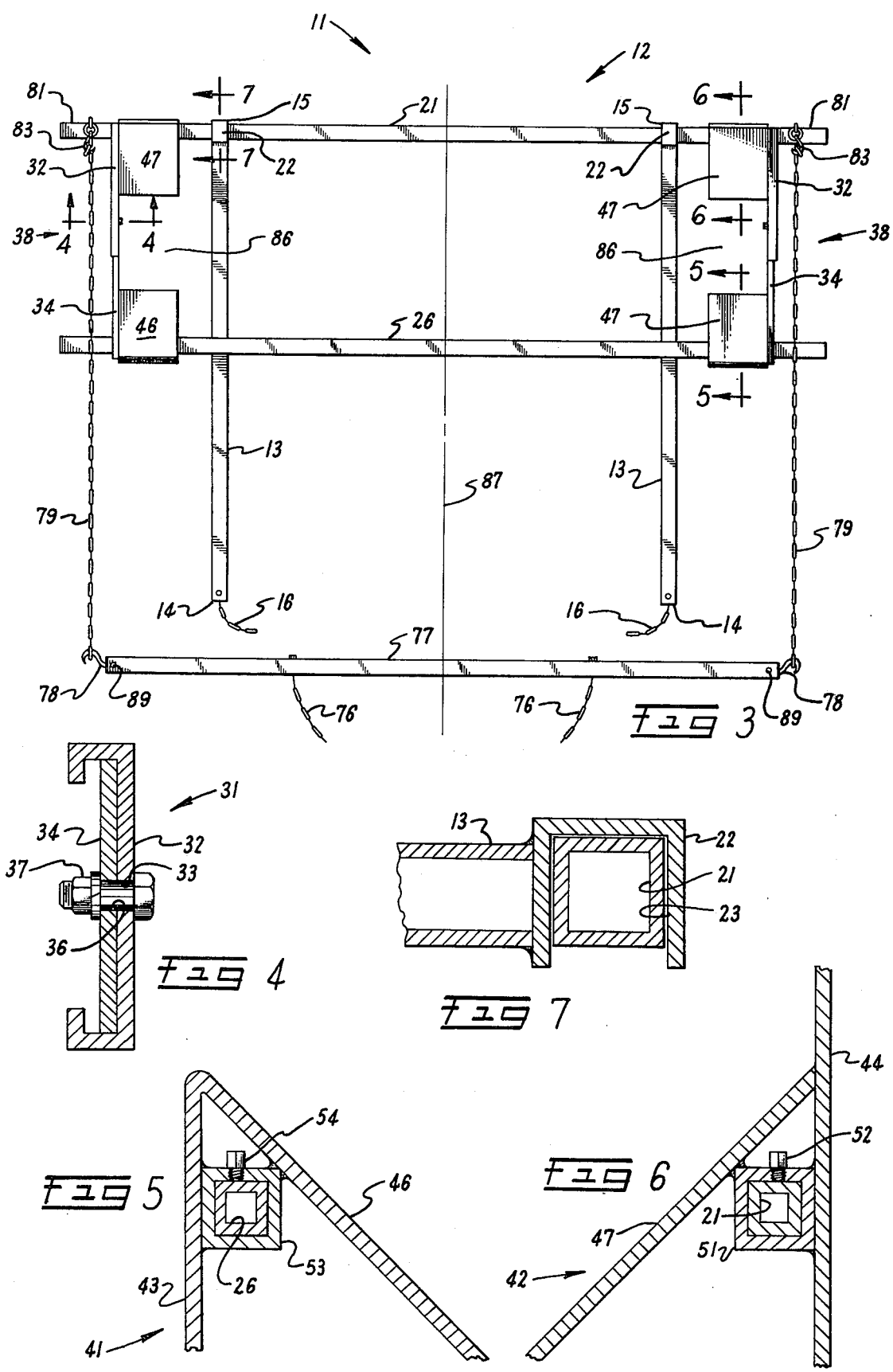

WHEEL SUPPORTING TOWING SLING ATTACHMENT

BACKGROUND OF THE INVENTION

Many motor vehicles, particularly foreign cars, can neither be towed by the bumper nor by connection to an axle. The bumper and vehicle suspension system presently found on most automobiles prohibits the former while lack of the traditional full transverse axle prevents the latter.

The patent literature and the market place are not without examples of towing slings in which either the front end or the back end of a vehicle to be towed can be raised by cradles installed under the vehicle's wheels. One such apparatus is disclosed in U.S. Pat. No. 3,897,879.

The patented device referred to above enables a towed vehicle to be lifted by the wheels and thus solves the problem of how to tow a car with-out hitching to a bumper or an axle. However, the apparatus disclosed in the patent involves not merely a wheel cradle but a rather sophisticated, complicated and not inexpensive piece of towing equipment involving a powered, extensible boom in addition to sling means.

In many instances it is desirable that wheel supporting devices be attachable to existing conventional towing rigs. In other words, despite the prior art there remains considerable room for improvement, particularly where it is desirable to adapt existing tow truck equipment to meet new demands.

SUMMARY OF THE INVENTION

The invention relates generally to attachements to towing slings of the type frequently carried by conventional tow trucks and, more especially, to attachments of this nature which directly engage and support either the front or back wheels of an automobile for purposes of lifting one end of the vehicle in order to tow it.

It is an object of the invention to provide a wheel supporting device which can be used to tow all kinds of motor vehicles.

It is another object of the invention to provide such a device which can conveniently be attached to substantially all kinds of towing slings now in use.

It is still another object of the invention to provide a towing sling attachment which is economical, light in weight and can readily be disassembled for compactness in storage and transportation, yet which is strong and safe and can quickly be installed on a motor vehicle to be towed.

It is yet a further object of the invention to provide a generally improved wheel supporting device.

Other objects, together with the foregoing, are attained in the embodiment described in the followng description and shown in the accompanying drawings.

SHORT DESCRIPTION OF DRAWINGS

FIG. 3 is a top plan view of the attachment, per se;

FIG. 4 is a sectional view, to an enlarged scale, the section being taken on the line 4 — 4 in FIG. 3;

Figure 1:
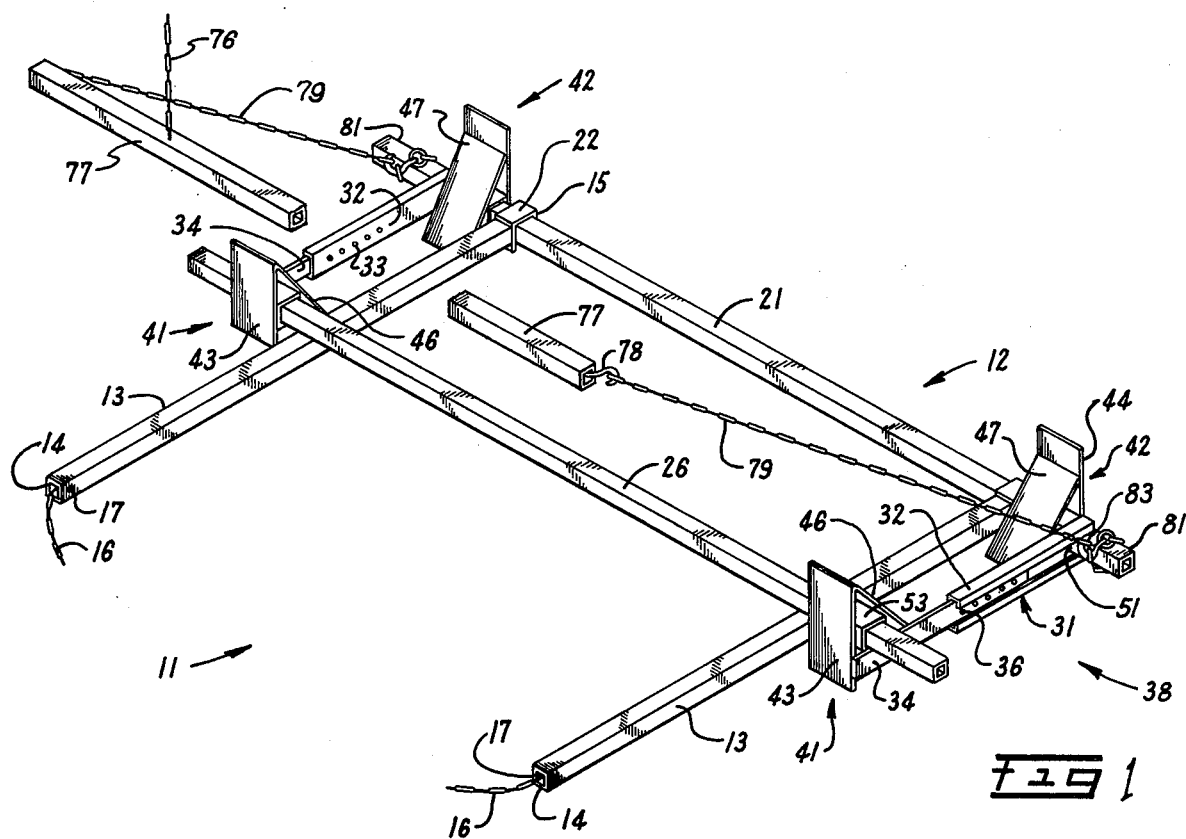
FIG. 1 is a top, front, perspective view of the wheel supporting attachment with a portion of the cross beam broken away in order to show structural features of the frame which would otherwise be obscured.

FIG. 5. is a sectional view, to an enlarged scale, the section being taken on the line 5 — 5 in FIG. 3;

FIG. 6 is a sectional view, to an enlarged scale, the seection being taken on the line 6 — 6 in FIG. 3; and, FIG. 7 is a sectional view, to an enlarged scale, the section being taken on the line 7 — 7 in FIG. 3.

DETAILED DESCRIPTION OF PREFERRED EMBODIMENT

While the wheel supporting towing sling attachment of the invention is susceptible of numerous physical embodiments, depending upon the environment and requirements of use, substantial numbers of the herein shown and described embodiment have been made and used with eminently satisfactory results.

The wheel supporting towing sling attachment of the invention, generally designated by the reference numeral 11, includes a substantially horizontal frame 12, comprising a spaced pair of fore and aft rails 13 extending longitudinally from a forward end 14 to an after end 15. The forward ends 14 are provided with short lengths of chain 16 secured to pins 17, the chains 16 beng used to connect the rails 13 to the adjacent ends of a bottom cross member 18 (see FIG. 2) used on the lower portion of the hitch structure 19 of most towing rigs. A pair of strong flexible straps 20 depending from the upper portion of the towing rig 19 connects to the bottom cross member 18.

Figure 2:
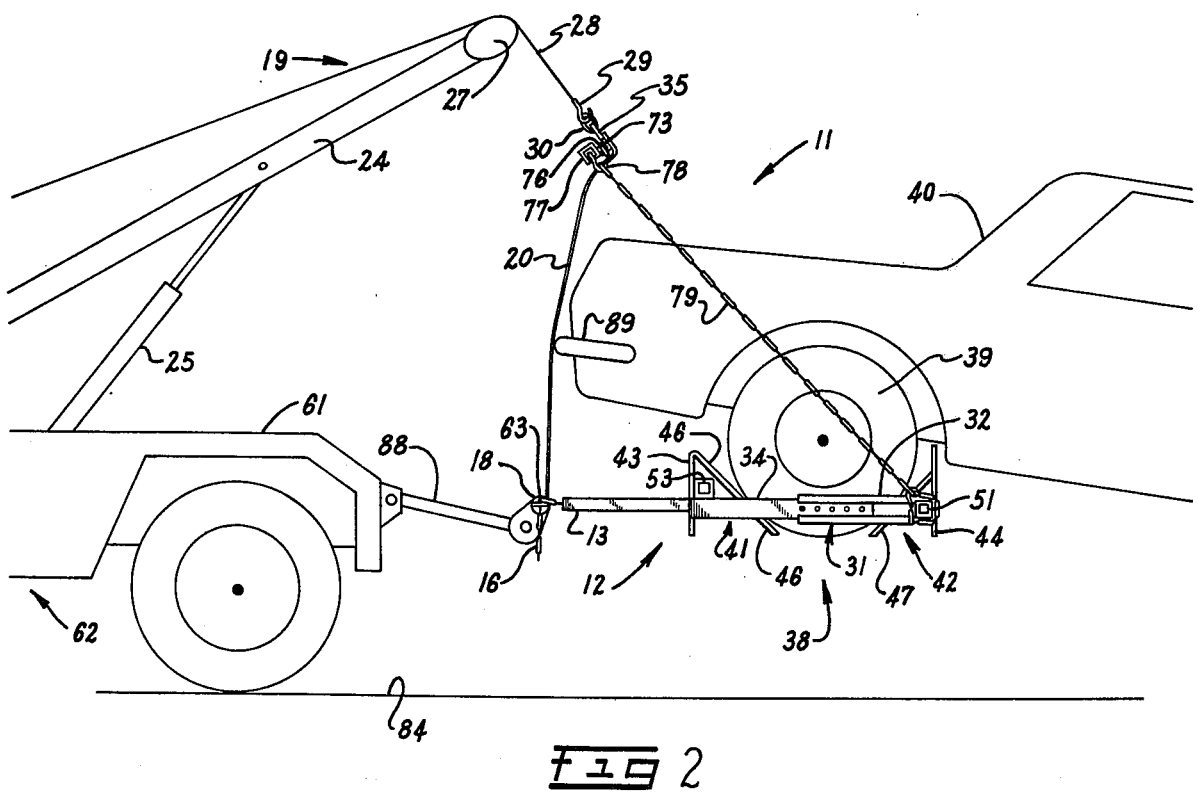
FIG. 2 is a side elevation view to a reduced scale showing the attachment connected to a conventional towing sling and installed in towing position, with the back wheels of a vehicle elevated for towing.

As used herein, the terms "towing rig" or "tow truck sling" are used interchangeably and refer to the equipment with which most conventional tow trucks are provided, including a pivoted boom 24, raised and lowered by a jack 25, and a pulley 27 over which is trained a flexible wire cable 28 controlled by a winch (not shown). A hook 29 on the end of the cable 28 engages a shackle 30 mounted on a cross plate 35 to which the upper ends of the flexible straps 20 are secured, as by riveting or bolting. The structure and operation of the tow truck sling 19 shown in FIG. 2 are well known. A detailed description is therefore not believed to be necessary.

The after ends 15 of the rails 13 are detachably supported on an after cross bar 21 by an inverted U-shape in cross section channel 22 mounted, as by welding, on the rail 13 (see FIG. 7). The inside dimensions of the channel 22 are such that the channel fits over the cross bar 21 with a slight clearance 23 between adjacent side surfaces. Assembly and disassemly are thereby facilitated.

Intermediate the forward ends 14 and after ends 15 of the fore and aft rails 13, the rails support a forward cross bar 26 parallel to the after cross bar 21. The forward cross bar 26 is spaced from the after cross bar 21 by an amount determined by the setting of a longitudinal wheel plate adjuster 31 includng a C-shaped in cross section channel 32 with a plurality of apertures 33 and a slide bar 34 having a plurality of openings 36. Fasteners 37 in registering apertures 33 and openings 36 hold the slide bar 34 and channel 32 in the desired relative position.

A wheel cradle 38 supports the wheel 39 of a vehicle 40 to be towed and comprises, in addition to the telescoping adjuster 31, a forward frame-work 41 and an after framework 42 located on opposite ends of the forward cross bar 26 and the after cross bar 21, respectively.

The frameworks 41 and 42 on both ends of the respective cross bars 26 and 21 are identical, although in mirror image, and a description of one pair of frameworks 41 and 42 on one end of the cross bars will therefore serve equally to describe the other pair of frameworks 41 and 42 on the other end of the cross bars 26 and 21.

In side elevation, as appears most clearly in FIGS. 5 and 6, the forward framework 41 and the after framework 42 are right triangular in shape, each including a vertical plate 43 and 44, respectively, and an inclined or slanted wheel supporting plate 46 and 47, respectively. The bases of the triangular frameworks 41 and 42 in side elevation are formed by the slide bar 34 and the C-shaped channel 32, respectively (see FIGS. 1 and 2).

The after framework 42 is provided with a hollow, square in cross section transverse sleeve 51 (see FIG. 6) dimensioned so as to receive in snug relation the transverse after cross bar 21. If desired, a securing device, such as a set screw 52, can be utilized to hold the after framework 42 at the desired transverse location on the cross bar 21.

Strength and rigidity are further afforded by welding together the C-shaped channel 32, the sleeve 51, the vertical plate 44 and the after slanted wheel supporting plate 47.

In like manner, the forward framework 41 includes a transverse sleeve 53 welded to the vertical plate 43, the forward slanted wheel supporting plate 46 and the slide bar 34. The forward transverse sleeve 53 is dimensioned so as to fit on the transverse forward cross bar 26 and can, as in the case of the after sleeve, include a set screw 54, or similar securing device.

As appears most clearly in FIG. 2, the forward sleeve 53 is located at an elevation higher than that of the after sleeve 51 so that the forward cross bar 26 passing through the forward sleeve 53 can be located above and supported on top of the longitudinal rail 13 as heretofore described. The after sleeve 51, as will be observed, is coaxial wth the after cross bar 21 which, in turn, is at the same height as the rail 13.

The slanted wheel supporting plates 46 and 47, serve to center and support the superposed wheel 39 of the vehicle 40 to be towed. In the mode depicted in FIG. 2, the vehicle's back wheels are cradled in the slant plates 46 and 47, with the forward slant plate 46 and the after slant plate 47 forming tangents with the wheel 39 at approximately 7 o'clock and at 5 o'clock, respectively. When viewed from the opposite side the wheel would be tangent with the forward plate 46 and the after plate 47 at about 5 o'clock and 7 o'clock, respectively.

Although FIG. 2 illustrates the back wheels of the vehicle in supported and elevated position, it should be noted that with equal facility the vehicle's front wheels could be used for towing.

As previously described, the forward end of the horizontal frame 12, and more particularly, the forward end 14 of the fore and aft rails 13, is supported by the bottom cross member 18 of the towing rig 19, or tow truck sling, mounted on the after end 61 of a towng vehicle 62, such as a tow truck. The forward ends of the rails 13 are connected to the opposite ends of the bottom cross member 18 by engagement between the short chain links 16 and hooks 63 on the ends of the bottom cross member 18.

Mounted on opposite ends of the towing rig's cross plate 35 are hooks 73 to which are attached two spaced chain links 76 mounted on a transverse crossbeam 77; and detachably mounted on hooks 78 on the ends of the crossbeam 77 is a pair of chains 79 extending downwardly and rearwardly to the transversely extending ends 81 of the after cross bar 21. The after ends of the chains 79 are looped around the cross bar extensions 81 and brought forwardly so as to engage the chains 79 by chain hooks 83 on the ends of the chains 79.

As is shown most clearly in FIG. 3, the left-hand wheel cradle 38 is C-shape in plan and the right-hand wheel cradle 38 is of reversed C-shape. In other words, between the forward wheel supporting plate 46 and the after wheel supporting plate 47 there is an opening 86 serving as a wheel well. This means that the wheel supporting cradles 38 can be installed on the vehicle's wheels while the wheels are on the ground.

OPERATION

Assuming that a conventional tow truck 62 has backed up to the rear end of a vehicle 40 to be towed, the first step in installing the present device 11 would be to attach the crossbeam 77 to the cross plate 35, or similar member, found on most towing rigs. Attachment of the crossbeam 77 is effected by connecting the short links 76 of chain on the crossbeam 77 to the respective hooks 73 provided on opposite ends of the cross plate 35.

Next, the wheel cradles 38 inlcudng the forward triangular frameworks 41 and after triangular frameworks 42 are located against their respective wheels 39 on both sides of the vehicle 40. The telescoping wheel plate adjusters 31 are then suitably adjusted, if necessary, so as to bring the slanted forward wheel supporting plates 46 and the slanted after wheel supporting plates 47 into the respective tangent points at approximately 7 o'clock and 5 o'clock, as shown in FIG. 2. The bottom edges of the vertical plates 43 and 44 and the bottom edges of the slant plates 46 and 47 are supported on the ground 84 as the wheel cradles 38 are being installed on the wheels 39.

It is again to be noted that the open space 86, or wheel well, between the wheel supporting plates 46 and 47 conveniently allows the cradles 38 to be slid transversely into position on the wheels 39 even with the wheels in engagement with the ground 84.

The forward cross bar 26 and the after cross bar 21 are then inserted transversely through the respective forward transverse sleeves 53 and after transverse sleeves 51. After the cross bars 26 and 21 are transversely centered, as appears in FIG. 3, so that the lateral extensions 81 project substantially equally beyond the cradles 38, in a transverse direction, the set screws 54 and 52 are tightened, if desired.

At a suitable juncture, the longitudinal rails 13 are placed in position with the channels 22 over the after cross bar 21 and the intermediate portion of the rails 13 underlying the forward cross bar 26. After arranging the rails 13 in a symmetrical manner on each side of a central fore and aft axis 87, as appears in FIG. 3, the chain links 16 are connected by hooks 63 to the ends of the lower cross member 18.

In order to help prevent side sway and maintain a fixed spatial relation between tow truck and towed vehicle during towing a stabilizing and positioning structure 88 projecting rearwardly from the after end of the tow truck 62 is connected to the central portion of the transverse lower cross member 18.

The chains 79 are next installed, the forward upper ends of the chains 79 being connected to the hooks 78 carried by pins 89 on the ends of the crossbeam 77. The after ends of the chains 79, as previously described, are looped once or twice around the extensions 81 of the after cross bar and hooks 83 on the after ends of the chain are hooked on the chain links themselves in such a manner that the loops are secure.

The dual belts 20 connected at their upper ends to the cross plate 71 and their lower ends to the bottom cross member 18 bear against the rear bumper 89 of the towed vehicle 40 and thereby further assist in damping fore and aft oscillation of the towed vehicle as towing takes place.

When several vehicles have the same wheel placements and dimensions, such as a shipment of cars on a dock, for example, very few if any adjustments need to be made to conform the attachment to the vehicle. However, since the wheel cradles can readily be shifted transversely inwardly and outwardly and the slated wheel supporting pans, or plates, can easily be moved toward and away from each other, vehicles of many different sizes and arrangements can quickly be accommodated.

With the attachment installed as just described the tow truck sling can be elevated in customary fashion, thereby raising the back end of the towed vehicle 40, as shown in FIG. 2, and allowing towing to proceed.

It can therefore be seen that I have provided a versatile wheel supporting attachment which enables existing conventional towing rigs safely and expeditiously to handle cars of all makes

What is claimed is:

1. A wheel supporting attachment for a tow truck sling comprising:
    a. a substantially horizontal frame includng an after transverse cross bar, a forward transverse cross bar, and a pair of longitudinal rails extending between a forward end and an after end, the after ends of said longitudinal rails being detachably secured to said after cross bar with intermediate portions of said longitudinal rails underlying said forward cross bar;
    b. a pair of fore and aft wheel cradles supported on said forward cross bar and said after cross bar, said wheel cradles being located on the opposite lateral sides of said frame and transversely spaced apart a distance such as to support a pair of wheels of a motor vehicle to be towed; and,
    c. means for attaching said frame to said sling with either the front wheels or the rear wheels of the vehicle to be towed lodged in said wheel cradles for elevation by said sling to vehicle towing position.

2. A wheel supporting attachment as in claim 1 in which the ends of said after cross bar project laterally beyond the sides of the vehicle to be towed, said attaching means includes a tranverse beam detachably mounted on said sling, the ends of said transverse beam being coextensive with said after cross bar, and a pair of chains connecting the ends of said tranverse beam with the respective ends of said after cross bar.

3. A wheel supporting attachment as in claim 2 further including mounting means on the forward ends of said longitudinal rails for connecting said rails to said sling.

4. A wheel supporting attachment as in claim 1 in which each of said cradles includes a forward framework having a rearwardly and downwardly inclined plate and an after framework having a forwardly and downwardly inclined plate, a superposed wheel of the towed vehicle being supported on said forward and said after plates at approximately 5 o'clock and 7 o'clock when viewed in side elevation.

5. A wheel supporting attachment as in claim 4 in which said forward framework and said after framework each includes a transverse sleeve capable of slidably receiving said forward cross bar and said after cross bar, respectively, for laterally adjusting the distance between said wheel cradles.

6. A wheel supporting attachment as in claim 5 in which each of said cradles includes fore and aft telescoping means connecting said forward framework and said after framework and said after framework for longitudinally adjusting the distance between said plates.

7. A wheel supporting attachment as in claim 6 in which said telescoping means includes a channel provided with a plurality of spaced apertures and a slide bar translatably disposed in said channel, said slide bar including a plurality of openings spaced for registry with said apertures in said channel, and means insertable through registering apertures and openings for securing said frameworks in selected transversely spaced relation.

8. A wheel supporting attachment as in claim 4 in which said forward framework is separated from said after framework by a laterally inwardly opening wheel well to enable said wheel cradles to be installed in wheel supporting position by transverse inward movement toward a wheel in engagement with the ground.

* * * * *